(12) United States Patent
Yeung et al.

(10) Patent No.: US 7,685,531 B2
(45) Date of Patent: Mar. 23, 2010

(54) SYSTEMS AND METHODS FOR LOCATING CONTENT IN A MEMORY

(76) Inventors: Simon D. Yeung, 5691 Spry Common, Fremont, CA (US) 94538; Kenneth B. Goldstein, 167 Beatrice St., Mountain View, CA (US) 94043; Gary R. Horne, 487 Heath St., Milpitas, CA (US) 95035

( * ) Notice: Subject to any disclaimer, the term of this patent is extended or adjusted under 35 U.S.C. 154(b) by 1064 days.

(21) Appl. No.: 10/836,120

(22) Filed: Apr. 30, 2004

(65) Prior Publication Data

US 2005/0246663 A1    Nov. 3, 2005

(51) Int. Cl.
*G06F 3/048* (2006.01)
(52) U.S. Cl. .................. 715/769; 715/764; 715/765; 707/200; 707/204
(58) Field of Classification Search ............. 715/739, 715/851, 764, 765, 769; 707/200, 204
See application file for complete search history.

(56) References Cited

U.S. PATENT DOCUMENTS

| | | | | |
|---|---|---|---|---|
| 5,371,851 A | * | 12/1994 | Pieper et al. ............... 345/501 |
| 5,625,818 A | * | 4/1997 | Zarmer et al. ............ 707/104.1 |
| 7,178,129 B2 | * | 2/2007 | Katz .......................... 717/108 |
| 7,194,691 B1 | * | 3/2007 | Zilka et al. .................. 715/739 |
| 7,370,281 B2 | * | 5/2008 | Weber ........................ 715/769 |
| 2005/0050471 A1 | * | 3/2005 | Hallisey et al. ............. 715/734 |
| 2005/0177796 A1 | * | 8/2005 | Takahashi ................... 715/769 |

OTHER PUBLICATIONS

Microsoft, Windows Xp Professional, copyright (1985-2001).*

* cited by examiner

*Primary Examiner*—Ba Huynh
*Assistant Examiner*—Phenuel S Salomon
(74) *Attorney, Agent, or Firm*—Vista IP Law Group, LLP.

(57) ABSTRACT

A user interface for displaying information includes a region for displaying information regarding one or more files that are stored in a memory, and a navigation map located adjacent the region, the navigation map displaying a graphic associated with information being displayed in the region, the graphic representing a quantity of the displayed information and a quantity of non-displayed information in the region. A method for locating an object stored in a memory includes providing a navigation tool displaying a plurality of folders, wherein a first folder and a second folder can be selected from the plurality of folders, and simultaneously displaying at least some content from the first folder and at least some content from the second folders in response to a selection of the first and the second folders.

10 Claims, 10 Drawing Sheets

SYSTEMS AND METHODS FOR LOCATING CONTENT IN A MEMORY

BACKGROUND OF THE INVENTION

1. Field of the Invention

The field of the invention relates to software and computer products, and more particularly, to software and computer products for managing data and files.

2. Background of the Invention

Many existing software allow users to create and store electronic files. Generally, these software provide a user interface that allows a user to select a location in which an electronic file can be created or stored. For example, a user can create a folder, a subfolder within a folder, or a subfolder within another subfolder, and the electronic file can be stored or created in the folder or subfolder. As such, electronic files of existing software are generally organized in "layers" of folders and subfolders. To retrieve a previously stored electronic file, a user would need to navigate through the folders and subfolders, one layer at a time, until the user has accessed the final subfolder in which the electronic filed is stored. The user then selects the file desired to be retrieved from the accessed subfolder. Sometimes, a user may wish a file to be associated with a plurality of folders or subfolders, such that the same file can be retrieved from different folders or subfolders. However, existing software do not allow an electronic file be associated with a plurality of folders or subfolders. As such, users of the existing software systems who wish to associate a file with multiple folders and/or subfolders may need to save the same file under different folders and/or subfolders. Such method disadvantageously uses a lot of storage space, and renders data and file management difficult. Also, such method requires a user to update all copies of the file in a data base if a change needs to be made to the file. Often times, a user may forget that a copy of the file being updated is also stored in another location, and as a result, only updates one copy of the file and not the other. This creates inconsistency in the duplicated files, compounding the difficulty in the management of files.

Existing user interfaces generally provide a navigation tool that displays a folder name, a subfolder name, and a file name in a tree configuration that represents a path in which they are created and stored. Users using such user interfaces can navigate to desired files based on the names (or identifiers) of the files and the names of the folders in which the files are stored. However, such name-based navigation method may be inefficient, and may not be desirable for certain applications.

Also, in existing user interfaces, once a desirable folder is located, the name of the objects within the folder are generally displayed in a column or table format. However, a user may wish to view a folder, a subfolder, or a stored file according to other attributes besides the name attribute. A user may also wish to view content within a folder in other formats besides the column format.

In addition, existing user interfaces do not allow a user to conveniently sort or filter contents being displayed, nor do they allow a user to conveniently sort or filter contents according to their attributes. Further, many existing software provide users with a finite number of attributes that may not be useful for a particular user. Such software generally do not allow users to create their own customized attributes for their specific needs.

Accordingly, new user interfaces and new methods for displaying and/or retrieving information are desirable.

SUMMARY OF THE INVENTION

In accordance with some embodiments of the invention, a user interface for displaying information, includes a first navigation region displaying information regarding one or more files that are stored in a memory, the first navigation region displaying a navigation tool for allowing a user to locate a file in the memory, and a navigation button for allowing a user to select a navigation method associated with the navigation tool.

In accordance with other embodiments of the invention, a user interface for displaying information includes a region for displaying information regarding one or more files that are stored in a memory, and a navigation map located adjacent the region, the navigation map displaying a graphic associated with information being displayed in the region, the graphic representing a quantity of the displayed information and a quantity of non-displayed information in the region.

In accordance with other embodiments of the invention, a method of displaying information stored in a memory includes displaying an identifier of the folder, displaying an attribute of an object that is stored in the folder, the attribute not being a name of the object, and displaying a graphic to associate the attribute with the folder.

In accordance with other embodiments of the invention, a user interface includes a window displaying a navigation tool for allowing a user to search for an object, wherein the navigation tool includes a graphic representing an aggregation of a first attribute and a second attribute of an object.

In accordance with other embodiments of the invention, a method of locating an object using a user interface includes selecting a first graphic representing a first attribute, dragging the selected first graphic to an area adjacent a second graphic, the second graphic representing a second attribute, thereby forming a third graphic representing a combination of the first and the second attribute, selecting the third graphic to access a first attribute value and a second attribute value that are associated with the respective first and second attributes, and selecting one or both of the first and the second attribute values to prescribe a criteria for searching an object.

In accordance with other embodiments of the invention, a computer product having a set of instructions, an execution of which causes a process to be performed, the process comprising displaying a navigation tool, wherein the navigation tool has a graphic representing an aggregation of a first attribute and a second attribute of an object.

In accordance with other embodiments of the invention, a method for locating an object stored in a memory includes providing a navigation tool displaying a plurality of folders, wherein a first folder and a second folder can be selected from the plurality of folders, and simultaneously displaying at least some content from the first folder and at least some content from the second folders in response to a selection of the first and the second folders.

Other aspects and features of the invention will be evident from reading the following detailed description of the preferred embodiments, which are intended to illustrate, not limit, the invention.

BRIEF DESCRIPTION OF THE DRAWINGS

The drawings illustrate the design and utility of preferred embodiments of the present invention, in which similar elements are referred to by common reference numerals. In order to better appreciate how advantages and objects of the present inventions are obtained, a more particular description of the present inventions briefly described above will be rendered by reference to specific embodiments thereof, which are illustrated in the accompanying drawings. Understanding that these drawings depict only typical embodiments of the invention and are not therefore to be considered limiting its scope, the invention will be described and explained with additional specificity and detail through the use of the accompanying drawings.

DETAILED DESCRIPTION OF THE ILLUSTRATED EMBODIMENTS

Figure 1:
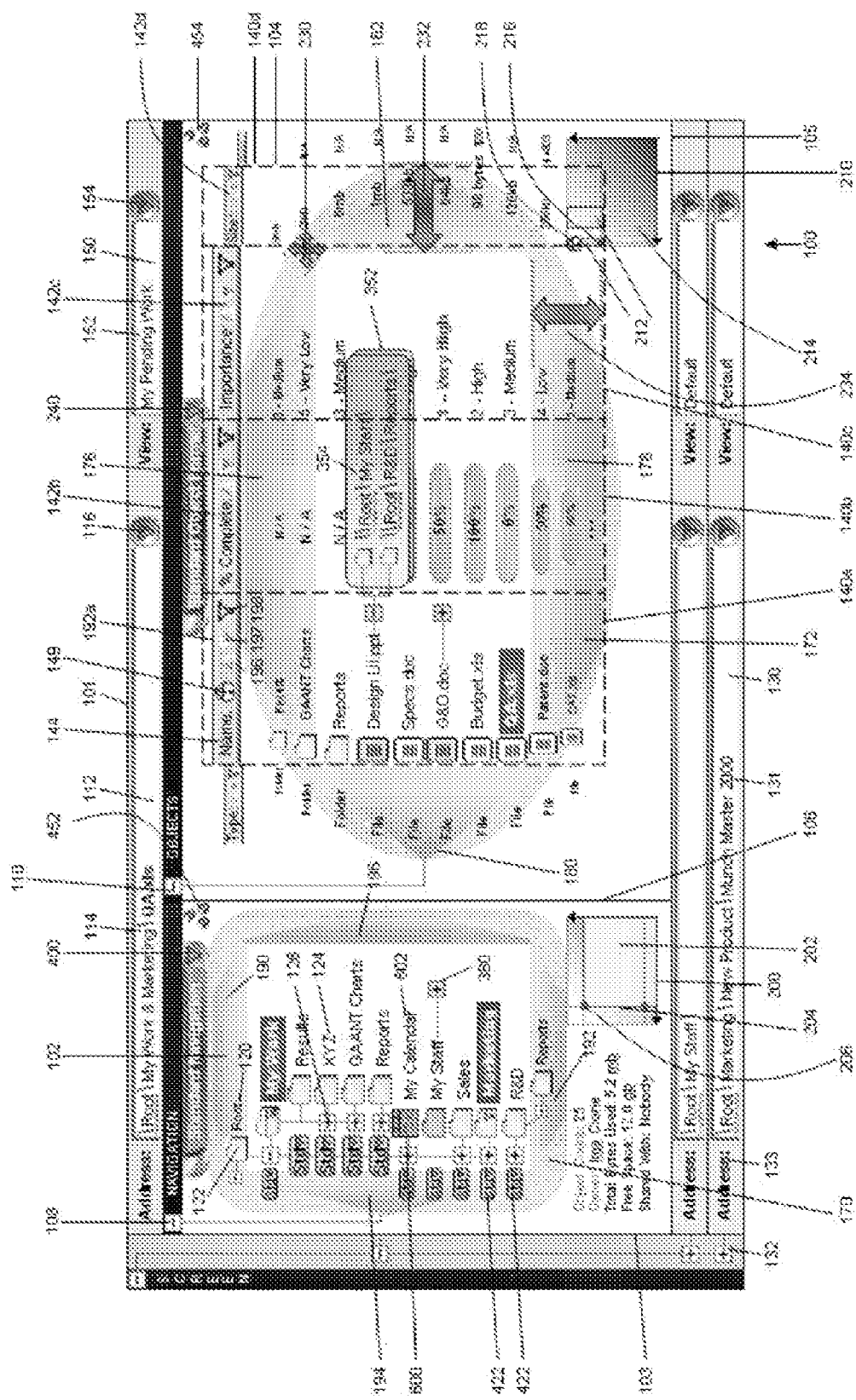
FIG. 1 illustrates a user interface in accordance with some embodiments of the invention.

Various embodiments of the present invention are described hereinafter with reference to the figures. It should be noted that the figures are not drawn to scale and that elements of similar structures or functions are represented by like reference numerals throughout the figures. It should also be noted that the figures are only intended to facilitate the description of specific embodiments of the invention. They are not intended as an exhaustive description of the invention or as a limitation on the scope of the invention. In addition, an illustrated embodiment needs not have all the aspects or advantages of the invention shown. An aspect or an advantage described in conjunction with a particular embodiment of the present invention is not necessarily limited to that embodiment and can be practiced in any other embodiments of the present invention even if not so illustrated.

FIG. 1 illustrates a user interface 100 in accordance with some embodiments of the invention. The user interface 100 includes a window 101 having a first sub-window (a navigation window) 103 and a second sub-window (an object window) 105. The navigation window 103 has navigation region 102 for displaying a navigation tool, which allows a user to navigate through a memory or a data system to search for a desired file. The object window 105 has an object region 104 for displaying content. The user interface 100 also includes a first minimization button 108 and a second minimization button 110 for allowing a user to minimize (e.g., by clicking the buttons 108, 110 using a mouse) the navigation region 102 and the object region 104, respectively, in a conventional manner. In the illustrated embodiments, when the navigation region 102 is minimized, the object region 104 automatically expands to occupy the area that was previously occupied by the navigation region 102, and vice versa. In other embodiments, minimization of either of the regions 102, 104 does not affect the size of the other of the regions 102, 104. A separator 106 is provided to separate the navigation region 102 and the object region 104. The separator 106 can be positioned (e.g., by clicking and dragging the separator 106 using a pointer) to adjust the sizes of the navigation region 102 and the object region 104.

In the illustrated example, the navigation region 102 is displaying identifiers 120 (or names) of folders 122, and identifiers 124 of files 126, in a standard navigation format. Particularly, the folder identifiers 120 and the file identifiers 124 are arranged in a "tree" configuration based on a location (or path) in which they are created or stored. The navigation region 102 also displays a proprietary folder 600 having "My Calendar" as its identifier 602. The proprietary folder 600 can have attributes that are different from the folders 122, and can store proprietary or customized content. In some embodiments, the user interface 100 integrates with other proprietary software, thereby allowing different 20 types of folders (i.e., folders having different attributes) be displayed together in the navigation region 102 and the object region 104. As such, the term "folder", as used in this specification, is not limited to conventional folder that is used for storing objects, and should include any entity within which an object can be stored (or with which an object is associated).

The user interface 100 further includes an address field 112 displaying texts 114 that represent a status of a navigational operation. The address field of the user interface 100 automatically displays the text 114, which indicates which folder(s) or files(s) are being selected by a user in the navigation region 102. The text 114 also indicates a path in which one or more of the currently displayed folder(s) or file(s) are created. In the illustrated embodiments, the text 114 is a single sentence that includes identifier(s) of folder(s), sub-folder(s), and/or file(s). The identifiers are separated by "\", wherein the object that corresponds with the identifier on the left side of the "\" symbol is a level higher (i.e., stored in a higher level) than the object that corresponds to the identifier on the right side of the "\". As shown in the example, the "My Work" folder and the "Marketing" folder are highlighted, indicating that these two folders have been selected by a user. When two objects (e.g., the "My Work" folder and the "Marketing" folders) have been selected in the navigation region 102, the corresponding identifiers of the selected objects can be displayed together and associated with each other by the symbol "&" in the address field 112, thereby forming at least a part of an address. It should be noted that the "\" and the "&" symbols are only examples that can be used to represent relationship among two or more files 124 or among two or more folders 122 being displayed in the navigation region 102, and that other symbols, text, combination of text, or graphics, can be used in alternative embodiments. Other methods of representing a selection of multiple objects in the address field 112 can also be used. In other embodiments, the text (or address) 114 can have different formats. For examples, the text 114 can include a plurality of sentences. Also, in other embodiments, instead of, or in addition to texts, the address field 112 can display a graphic, such as a symbol, a chart, or a numeric code, to represent a current status of a navigation operation. As shown in the illustrated embodiments, the user interface 100 further includes an address menu button 116, the selection of which provides a user with a list of available texts (or addresses) 114 previously created.

The user interface 100 also includes a bar 133 having an additional address field 130 that displays additional an address 131 associated with another navigation operation. In the illustrated example, two additional address fields 130 are shown. However, the user interface 100 can display other number of additional address fields 130. A navigation window selection button 132 is provided for each additional address field 130. When the navigation window selection button 132 is selected, the user interface 100 will hide the content being displayed in the current navigation and object regions 102, 104, and displays content associated with another navigation operation (i.e., the navigation operation associated with the corresponding address 131). In other embodiments, navigation and object regions 102, 104 corresponding to another navigation operation can be displayed by selecting the bar 133. In such cases, the navigation window selection button 132 is optional, and the user interface 100 may not include the navigation window selection button 132. In some embodiments, the user interface 100 can display a plurality of navigation regions 102 and a plurality of object regions 104 that are associated with a plurality of corresponding navigation operations.

In the illustrated embodiments, the object region 104 is displaying content that are associated with an operation in the navigation region 102. Particularly, the content being displayed in the object region 104 includes at least a portion of the content stored within the selected folder(s) in the navigation region 102. In the illustrated example, because the "My Work" folder and the "Marketing" folder are selected in the navigation region 102, the object region 104 accordingly displays content that are stored within these folders.

One or more objects can be selected in the object region 104. In the illustrated example, the file "QA.xls" has been selected in the object region 104. Accordingly, the address field 112 also includes the identifier (i.e., "QA.xls") of the selected file as part of the address 114. In other embodiments, the address field 112 does not include identifier of selected file in the object region 104. Although the address field 112 has been described as automatically displaying text 114 (or address) in response to a selection of file(s) and/or folder(s) in the navigation and object regions 102, 104, the scope of the invention should not be so limited. In alternative embodiments, a user can type a desired address in the address field 112, and the user interface 100 will display file(s) and/or folder(s) in the navigation and/or object regions 102, 104 in response to the prescribed address in the address field 112.

In the illustrated embodiments, content in the object region 104 are being displayed in a column format. When displaying content in the column format, the object region 104 includes a plurality of columns 140 of content, with each column 140 representing an attribute of an object (e.g., a file or a folder). Each column 140 includes a header field 142 displaying an attribute identifier 144, sort buttons 146, 147, and a filter button 148. The sort buttons 146, 147 allow a user to sort content in the corresponding column 140 in ascending (or increasing) and descending (or decreasing) orders, respectively. In other embodiments, the user interface 100 does not provide the sort buttons 146, 147. In such cases, content in a column 140 can be sort in one order by clicking on the corresponding header 142, and be sort in another order by clicking on the corresponding header 142 again. The filter button 148 allows a user to prescribe criteria for filtering undesirable content such that only desirable content are displayed in the corresponding column 140. For examples, in some embodiments, the user interface 100 provides a menu and/or an input field in response to a user selecting the filter button 148. The user can then use the menu and/or the input filed to prescribe attribute value(s) and/or to input operators (e.g., ">", "<", "=", "and", "or") to filter content being displayed in the object region 104.

The columns 140 can be positioned relative to each other to suit a particular need of a user. For example, a user can move the "% Complete" column 140b to the right of the "Importance" column 140c (e.g., by placing a pointer on the header field 142b and dragging the header field 142b to the right of header field 142c). The user interface 100 also allows a user to lock a position of a column 140 such that the column 140 cannot be positioned. For example, a user can position a pointer in the "Name" column 140a and activate a right mouse button to access the locking feature, thereby locking the position of column 140a relative to the object region 104. In such cases, the locked column 140a would remain displayed in the same position relative to the object region 104 while the user navigates through other content in the object region 104. Methods of navigating through displayed content in the navigation and object regions 102, 104 would be described in detail below. When a column (e.g., the "Name" column 140a) has been locked in position, a lock symbol 149 is displayed in the corresponding header 142. In some embodiments, a user can unlock the column 140 by selecting (e.g., clicking) the lock symbol 149. Also, in other embodiments, one or more columns 140 can be hidden or deleted, and not be displayed in the object region 104.

In the illustrated embodiments, the user interface 100 also includes a view field 150 displaying a name 152 of a viewing preference. The viewing preference represents a user's preference in viewing content in the object region 104. In the illustrated embodiments, each viewing preference prescribes a sorting preference and a filtering preference. In other embodiments, each viewing preference can also prescribe the number and/or the location of columns 140, the number and/or the location of rows 156 of objects, and a format in which content is being displayed in the object region 104. A menu button 154 can be provided that allows a user to access a list of available viewing preferences. In some embodiments, the viewing preference further includes the type of format (e.g., column format) in which the object region 104 presents information. Other types of format in which the object region 104 displays information will be described below.

Data Sphere

In the illustrated embodiments, content in the navigation and object regions 102, 104 are being displayed in a format such that the content appear printed on respective curved surfaces 170, 172. In such configuration, content closer to the peripheries of the navigation and object regions 102, 104 appear smaller. This is advantageous in that it allows more content to be displayed in the respective regions 102, 104 for a given display area. In the illustrated embodiments, the curved surfaces 170, 172 in the respective regions 102, 104 resembles spheres or three-dimensional ellipses. Alternatively, the curved surfaces in the regions 102, 104 can each resemble a tube, a cone, or other curvilinear shapes. In other embodiments, content in the navigation and object regions 102, 104 can be displayed in other formats. For example, content in the navigation and object regions 102, 104 can be displayed such that they appear printed on respective flat surfaces. Also, in other embodiments, the formats of display can be different between the navigation and object regions 102, 104. For example, content in the navigation region 102 can be displayed in a "curved" format, while content in the object region 104 can be displayed in a "flat" format, and vice versa.

To navigate through displayed content or to access non-displayed content in the navigation region 104, a user can position a pointer to select an area proximate to a top portion 176, a bottom portion 178, a left portion 180, or a right portion 182 of the curved surface (or sphere) 172 to "turn" the sphere 172, thereby scrolling through content towards the top, the bottom, the right, or the left, respectively. Similarly, to navigate through displayed content or to access non-displayed content in the navigation region 102, a user can position a pointer to select an area proximate to a top portion 190, a bottom portion 192, a left portion 194, or a right portion 196 of the curved surface (or sphere) 170 to "turn" the sphere 170, thereby scrolling through content towards the top, the bottom, the right, or the left, respectively. Other methods for navigating through displayed content or accessing non-displayed content in the navigation region 102 and/or the object region 104 can also be used. In alternative embodiments, one or two scrolling bars can be provided in each of the regions 102, 104 for scrolling through content in different directions. Also, in other embodiments, one or a plurality of scrolling buttons can be provided in each or both of the regions 102, 104 for allowing a user to scroll through content.

In the illustrated embodiments, a universal positioner 230, a horizontal positioner 232, and a vertical positioner 234 are provided in the object region 104. The universal positioner 230 is configured for allowing a user to rotate the sphere 172 in a plurality of directions. For example, during use, a user can place a pointer over the positioner 230 and press a mouse button to rotate the sphere 172. In some embodiments, the position of the pointer relative to the positioner 230 can be used to determine a direction of rotation of the sphere 172. Similarly, the horizontal positioner 232 allows a user to rotate the sphere 172 in a left or right direction (e.g., by placing a pointer at either end of the horizontal positioner 232 and pressing a mouse button), and the vertical positioner 234 allows a user to rotate the sphere 172 in an up or down direction (e.g., by placing a pointer at either end of the vertical positioner 234 and pressing a mouse button). In some embodiments, the user interface 100 allows a user to position the positioners 230, 232, 234 to desired positions within the object window 105, thereby customized his/her own viewing preference. Also, in other embodiments, the user interface 100 may not include any or all of the positioners 230, 232, 234.

Navigation Map

The user interface 100 also includes a first navigation map 200 and a second navigation map 210 associated with the respective navigation and object regions 102, 104. The navigation maps 200, 210 allow a user to know an extent of the displayed content relative to all available content (e.g., all searchable content within a memory or database) in respective regions 102, 104. In the illustrated embodiments, the navigation map 200 includes a first region 202 highlighted in a first color, and a second region 204 highlighted in a second color different from the first color. The first region 202 represents content that are being displayed in the navigation region 102, while the second region 204 represents content that are not displayed in the navigation region 102. In the illustrated example, portion of the second region 204 is located above the first region 202, indicating that there are non-displayed content (e.g., folder(s) and/or file(s)) above that shown in the navigation region 102 that can be accessed. In such case, a user can scroll the content displayed in the navigation region 102 downward to see additional content above the "Root" folder, for example. As such, the relative size and relative position of the first region 202 relative to the second region 204 allow a user to know an extent of the displayed content relative to all available content, thereby providing a searchable direction for the user. The navigation map 200 also includes one or more markers 206 representing object(s) that have been selected in the navigation region 102. In the illustrated example, the "My Work" folder and the "Marketing" folders are selected in the navigation region 102.

Accordingly, the navigation map 200 displays two markers 206, the positions of which relative to the first region 202 correspond to the respective positions of the selected folders relative to the displayed content in the navigation region 102.

Similarly, in the illustrated embodiments, the navigation map 210 includes a first region 212 highlighted in a first color, and a second region 214 highlighted in a second color different from the first color. The first region 212 represents content that are being displayed in the object region 104, while the second region 214 represents content that are not displayed in the object region 104. In the illustrated example, portion of the second region 214 is located to the right of the first region 212, indicating that there are non-displayed content (e.g., folder(s) and/or file(s)) to the right of that shown in the object region 104 that can be accessed. In such case, a user can scroll the content displayed in the object region 104 towards the left to see additional content to the right of the "Size" column 140d, for example. As such, the relative size and relative position of the first region 212 relative to the second region 214 allow a user to know an extent of the displayed content relative to all available content, thereby providing a searchable direction for the user. The navigation map 210 also includes one or more markers 216 representing object(s) that have been selected in the object region 104. In the illustrated example, the "QA.xls" file is selected in the object region 104. Accordingly, the navigation map 210 displays a marker 216, the position of which relative to the first region 212 corresponds to the position of the selected file relative to the displayed content in the object region 104. Further, the navigation map 210 can include a lock symbol 218, representing that a position of a column 140 (e.g., column 140a) in the object region 104 has been locked.

It should be noted that the navigation maps 200, 210 can have other formats and configurations, and therefore, should not be limited to the examples discussed previously. For examples, in other embodiments, the navigation maps 200, 210 can have other shapes and/or sizes, and can be configured to display different graphics for presenting information to a user. Also, in other embodiments, the user interface 100 allows a user to select whether to display the navigation maps 200, 210 in the respective regions 102, 104, and/or allows a user to place the navigation maps 200, 210 in desired locations within the window 101. In further embodiments, the user interface 100 may not include the navigation maps 200, 210.

Grid Format

In the above described embodiments, the object region 104 displays content in column formats (e.g., attributes of objects are displayed in columns). However, the scope of the invention should not be so limited. In alternative embodiments, the object region 104 can display content in other formats or arrangements. As shown in FIG. 1, the user interface 100 further includes a format button 240, the selection of which allows a user to prescribe a format for displaying content in the object region 104. Particularly, when the format button 240 is selected, a menu is provided that allows a user to select from a list of available formats for displaying content in the object region 104. In the illustrated embodiment, a name "Standard Object Format" is displayed adjacent to the format button 240, indicating that content are being displayed in a standard format (e.g., column format).

Figure 2:
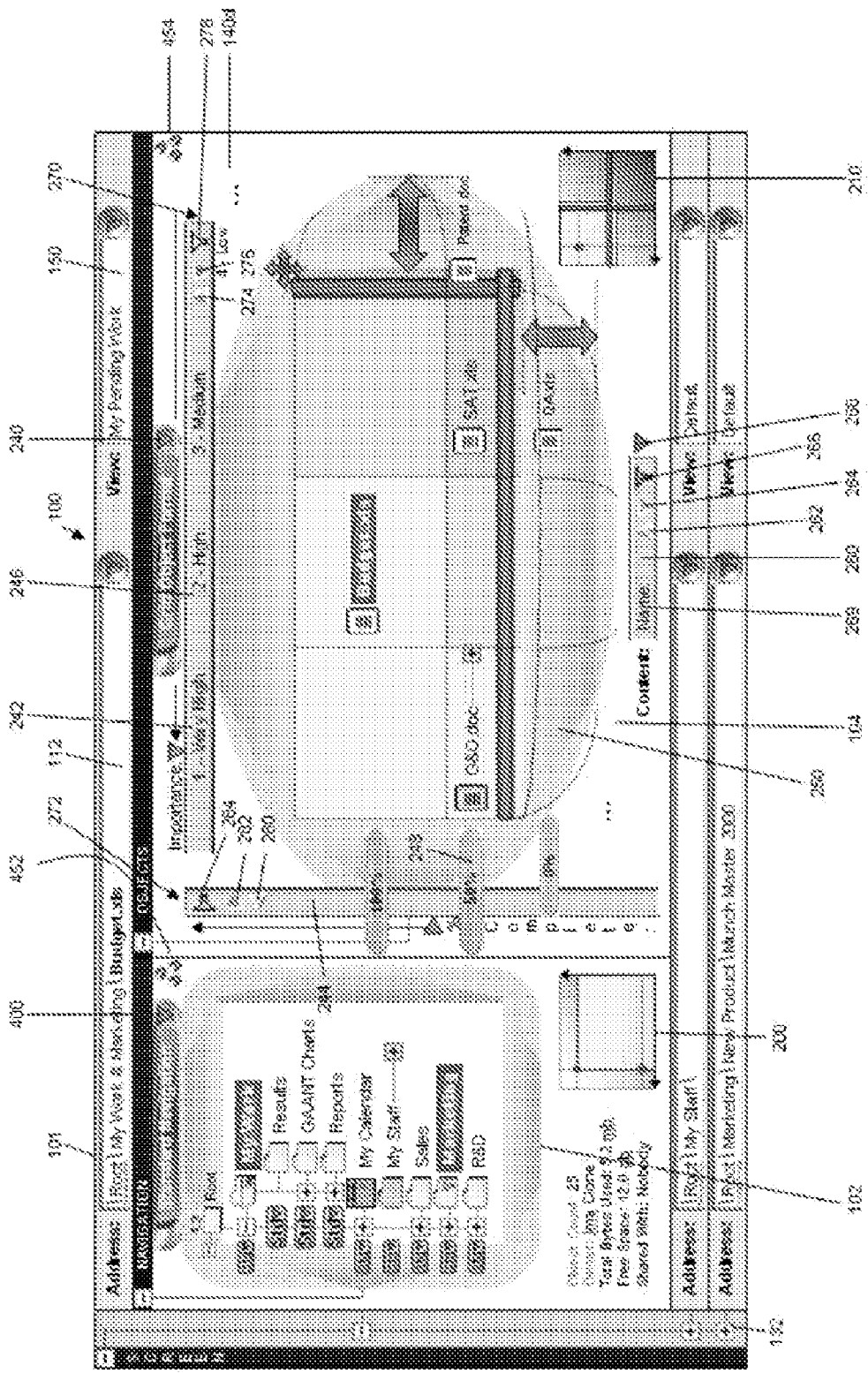
FIG. 2 illustrates the user interface of FIG. 1, showing the user interface displaying content in a grid format.

In other embodiments, a user can prescribe the object region 104 to display contents in a grid format (FIG. 2). When displaying information in a grid format, the object region 104 displays a first grid 242 representing a first attribute, and a second grid 244 representing a second attribute. The attributes represented by the grids 242, 244 can be default attributes or customized attributes (e.g., attributes defined by a user, or attributes associated with another proprietary application). The object region 104 also displays ranges of attribute values 246, 248 for the respective attribute types as represented by the respective grids 242, 244. The first and the second grids 242, 244 are perpendicular relative to each other, thereby defining a plot region 250 in which content can be plotted. In the illustrated example, the first grid 242 represents "Importance" attribute, having attribute values, "Very High", "High", "Medium", or "Low", and the second grid 244 represents "% Completeness" attribute, having attribute values that ranges between 0% to 100%. Also, identifiers (or names) of objects 251 (e.g., "SAT.xls", "Budget.xls", "Patent.doc", etc.) are plotted in the plot region 250 based on the attribute values of their respective "Importance" and "% Completeness" attributes. For example, the file having name attribute "Budget.xls" is plotted in the plot region 250 based on its "Importance" attribute value of "Very High" and its "Completeness" attribute value of "100%", and the file having name attribute "Patent.doc" is platted based on its "Importance" attribute value of "Low" and its "Completeness" attribute value of "50%".

It should be noted that the grids 242, 244 can represent other attributes, and therefore, the scope of the invention should not be limited to the example discussed previously. In the illustrated embodiments, the user interface 100 further includes attribute menu buttons 270, 272 for allowing a user to select different attributes for the respective grids 242, 244. For example, when the attribute menu button 270 is selected, a menu listing all available attributes is provided to a user, from which the user can select an attribute to be represented by the first grid 242. Similarly, when the attribute menu button 272 is selected, a menu listing all available attributes is provided to a user, from which the user can select an attribute to be represented by the second grid 242. As such, the attribute menu buttons 270, 272 allows a user to create his/her customized graph in the object region 104.

The first grid 242 further includes sorting buttons 274, 276 for sorting content being displayed in the plot region 250 based on an ascending or descending order, respectively, of the attribute values as represented by the first grid 242. Similarly, the second grid 244 further includes sorting buttons 280, 282 for sorting content being displayed in the plot region 250 based on an ascending or descending order, respectively, of the attribute values as represented by the second grid 244. In other embodiments, sorting buttons are not provided in the grids 242, 244. In such cases, content displayed in the plot region 250 can be sorted based on one order (e.g., increasing order) of attribute values as represented by the first grid 242 by clicking on the first grid 242, and based on another order (e.g., decreasing order) of attribute values as represented by the first grid 242 by clicking on the first grid 242 again. Similar is true with respect to the second grid 244.

The first grid 242 also includes a filter button 278 for filtering content being displayed in the plot region 250 based on prescribed criteria of the attribute values as represented by the first grid 242. For example, when the filter button 278 is selected, a sub-menu can be provided to a user which allows the user to prescribe all objects having "Importance" attribute values higher than "Medium" be displayed in the plot region 250, thereby filtering all objects having "Importance" attribute value that equal to "Medium" and "Low". Similarly, the second grid 244 also includes a filter button 284 for filtering content being displayed in the plot region 250 based on prescribed criteria of the attribute values as represented by the second grid 244.

In the illustrated embodiments, identifiers-(or names) of objects (e.g., files and folders) are plotted in the plot region 250. Alternatively, instead of plotting identifiers of objects, the user interface 100 can plot other attributes of the objects in the plot region 250. The user interface 100 further provides a content control 260 for allowing a user to control content being displayed in the plot region 250. The content control 260 includes a first sort button 262 for sorting content in an ascending or increasing order, a second sort button 264 for sorting content in a descending or decreasing order, a filter button 266, and a menu button 268. The filter button 266 allows a user to prescribe criteria for filtering undesirable content such that only desirable content are displayed in the plot region 250. For examples, in some embodiments, the user interface 100 provides a menu and/or an input field in response to a user selecting the filter button 266. The user can then use the menu and/or the input filed to prescribe attribute value(s) and/or to input operators (e.g., "<", ">", "=", "and", "or") to filter content being displayed in the plot region 250. The menu button 268 allows a user to prescribe a type of attribute to be plotted in the plot region 250. Particularly, when the menu button 268 is selected, the user interface 100 provides a list of available attributes from which a user can select for plotting in the plot region 250. In the illustrated embodiments, values of the "name" attribute of objects are being plotted—as indicated by a header 269 in the content control 260. Alternatively, or additionally, value(s) of other attribute(s) can also be plotted in the plot region 250.

In the illustrated embodiments, the plot region 250 has a display that resembles a sphere. However, in other embodiments, the plot region 250 can have a display that resembles other curvilinear surfaces, such as an ellipse, a tube, or a cone, or a flat surface, as similarly discussed previously. Also, the method of navigating through the displayed content in the object region 104 is similar to that discussed previously, and therefore, would not be described in further detail. Further, in the illustrated embodiments, the navigation map 210 in the object region 104 continues to display graphic representing displayed and non-displayed content even when the object region 104 has been prescribed to display content in a different format (e.g., the grid format).

As discussed previously, the view field 150 of the user interface 100 is configured to display the name 152 of the viewing preference. In some embodiments, the viewing preference includes the type of format (e.g., column format, grid format, etc.) in which the object region 104 presents information. In other embodiments, the viewing preference does not include the format type. Also, in some embodiments, when the grid format is used, the viewing preference includes the attribute types represented by the grids 242, 244, and the attribute type(s) that are being plotted in the plot region 250. In other embodiments, default attribute types for forming the grids 242, 244, and for plotting in the plot region 250 are used whenever a user selects the grid format for displaying content in the object region 104.

Figure 3:
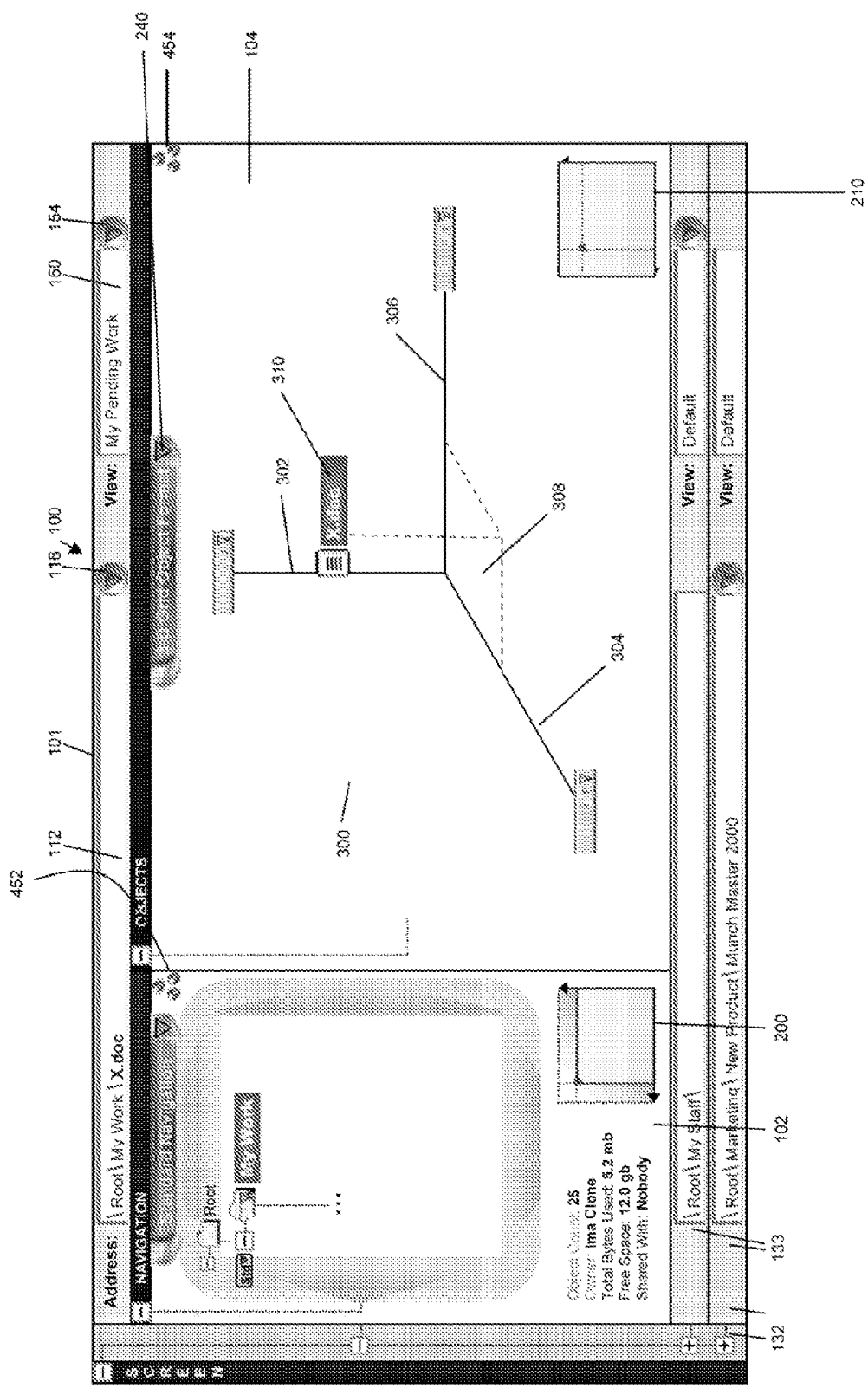
FIG. 3 illustrates the user interface of FIG. 1, showing the user interface displaying content in a three-dimensional grid format.

It should be noted that the type of format in which the object region 104 present information should not be limited to the examples discussed previously, and that the object region 104 can present information using other formats. For example, in other embodiments, instead of providing a two-dimensional plot, the object region 104 can display a three-dimensional plot 300 (FIG. 3). The three-dimensional plot 300 has a first grid 302 representing values of a first attribute, a second grid 304 representing values of a second attribute, and a third grid 306 representing values of a third attribute. The grids 302, 304, 306 are perpendicular relative to each other, thereby forming a plot region 308 in which content 310 can be plotted. Each of the grids 302, 304, 306 can include other features, such as filtering buttons, sort button, and attribute menu button, as similarly discussed previously. Also, in other embodiments, instead of a Cartesian-type plot, the object region 104 can display a radial plot.

Context Link

The objects (e.g., files 126 and folders 122) displayed in the navigation region 102 and the object region 104 can be created in a variety of ways. In some embodiments, the user interface 100 includes an object menu (not shown) that allows a user to create an object, such as a folder or a sub-folder. In other embodiments, the objects can be files (e.g., Word files, Excel files, Powerpoint files, CAD files, etc.) created by proprietary software or program, or files created by a user. In such cases, the user interface 100 can be integrated with the proprietary software or program, and/or with a user's operating system, such that files associated with the proprietary software and/or the operating system can be saved into folder(s) or sub-folder(s) created using the user interface 100.

Figure 4A:
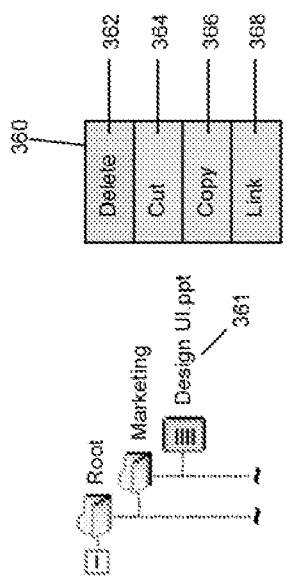
FIGS. 4A-4D illustrate a process for associating an object with multiple addresses.
Figure 4B:
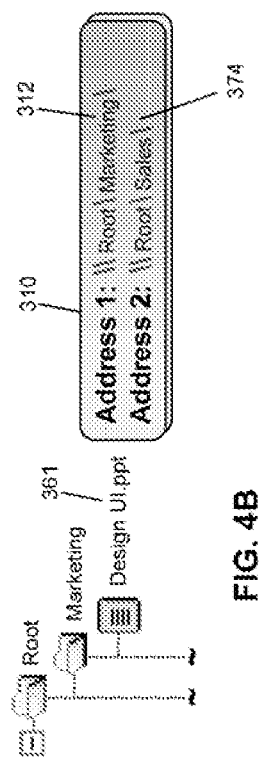

In some embodiments, the user interface 100 also allows a user to store an object (e.g., a file or a folder) such that it can be accessed from one or a plurality of locations. Particularly, a user can position a pointer in either of the navigation region 102 and the object region 104 next to an object 361 and access an operation menu 360 for the corresponding object 361 (e.g., by pressing a right button of a mouse) (FIG. 4A). In the illustrated embodiments, the operation menu 360 includes a "Delete" button 362 for deleting the object 361, a "Cut" button 364 for cutting the object 361 (such that the object 361 can be pasted to a different location, such as, a different folder), a "Copy" button 366 for copying the object 361, and a "Link" button 368 for associating the object 361 with additional location(s) from which the object 361 can be accessed. When the "Link" button 368 is selected, the user interface 100 provides a link input menu 370 (FIG. 4B). The link input menu 370 includes a first address 372 representing an initial location in which the object 361 is created or stored, and an address input field 374 for allowing a user to input an additional address from which the object 361 can be accessed. In other embodiments, the link input menu 370 only includes additional address(es) from which the object 361 can be accessed, and does not include a current address (e.g., the address 372) from which the object 361 is being displayed. In some cases, the object 361 can have more than two addresses, in which case, the link input menu 370 will display all the created addresses. It should be noted that after the object 361 has been associated with multiple addresses, the user interface 100 does not make a copy of the object 361 and stored in the additional address(es). Rather, the user interface 100 creates an association (or link) between the originally stored object 361 and the additional address(es). As such, the object 361 can be opened from one of the addresses and can be modified, and the modified object 361 can be accessed from other additional address(es). This is advantageous in that it allows an object to be accessed from multiple locations, eliminates the need to update multiple copies of the object 361 when changes are made to one copy of the object 361, and provides a data/file management system that is memory efficient.

It should be noted that the manner in which the object 361 is associated with multiple addresses is not necessary limited to the example discussed previously, and that other methods can be used. For example, in alternative embodiments, the user interface 100 can provide a sub-window (not shown) when the link button 368 is selected. In such cases, the sub-window displays objects (e.g., folders and files) in a tree format similar to that shown in the navigation region 102 of FIG. 1. A user can then navigate within the sub-window to select one or more folders with which the object 361 can be associated.

Figure 4C:
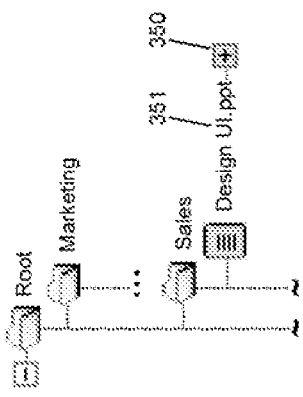
Figure 4D:
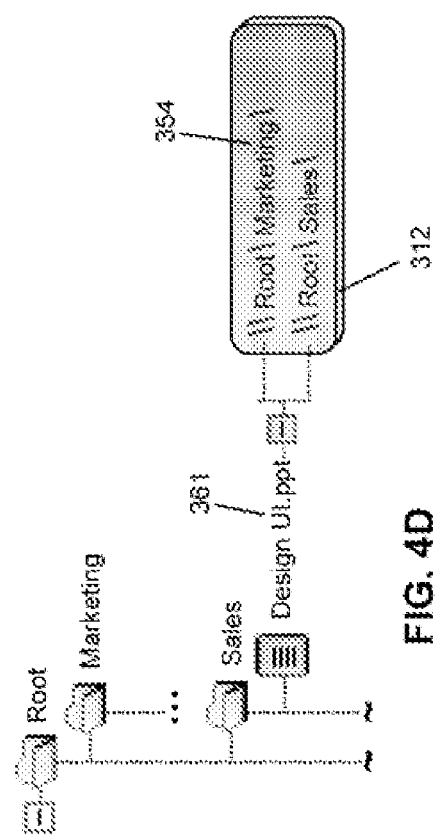

As shown in FIGS. 4B and 4C, after an additional address (e.g., "\\Root\Sales\") has been inputted in the address input field 374, the same file 351 "Design U1.ppt" can be accessed from the location that corresponds to the additional address. A graphic (e.g., a link indicator 350) can be provided next to the object 351 to inform a user that the associated object 350 can be accessed from more than one location (e.g., in different folders). When the link indicator 350 is selected, the user interface 100 further provides a link menu 352 listing addresses (or locations) 354 from which the associated object can be accessed (FIG. 4D). In the illustrated embodiments, the link menu 352 includes all available addresses 354. Alternatively, the link menu 352 only includes additional address(es) (e.g., the "\\Root\Marketing\" address) and not the address (e.g., the "\\Root\Sales\" address) from which the object 361 is being displayed. In other embodiments, the link indicator 350 includes a number indicating a quantity of all locations (or additional locations) from which an object can be accessed.

As illustrated in the example, associating an object with multiple addresses allows the object to be accessed from a plurality folders, without the object itself being physically copied into the folder(s). Various methods can be used to associate an object with multiple addresses. In some embodiments, pointers can be used. In such cases, one or more folders can point to one or more files or other folders. In other embodiments, a file can contain, as a part of its content, information that specify its parent folder (i.e., ancestor) location(s). Other methods can also be used.

In the illustrated embodiments, the addresses 354 are expressed in the form of a context links (i.e., similar to the format in which the additional address is inputted). As shown in the illustrated example, the link menu 352 of the file "Design UI.ppt" provides the addresses 354 "\\Root\Marketing\" and "\\Root\Sales\", indicating that the "Design UI.ppt" file can be accessed either from the "Marketing" sub-folder that is within the "Root" folder, or from the "Sales" sub-folder that is within the "Root" folder. Alternatively, the addresses 354 can be expressed in other formats. In alternative embodiments, instead of displaying the link menu 352 when the link indicator 350 is selected, the user interface 100 displays the link input menu 370. In such cases, the link input menu 370 would display all inputted addresses (e.g., "\\Root\Marketing\" and "\\Root\Sales\") and provide the input field 374, thereby allowing a user to input additional address if desired. In some embodiments, a user can use a pointer to select one of the displayed addresses 354 (in either the link menu 352 or the link input menu 370, depending which one is used), and modify the selected address 354 such that the corresponding object is associated with a different location from which the object can be accessed.

Attribute-Based Navigation

In the previously described embodiments, the navigation region 104 displays identifiers of objects in a tree configuration for allowing a user to navigate to desired objects. However, in alternative embodiments, the navigation region 104 can present other types of navigation tool for assisting a user to navigate to desired objects. As shown in FIG. 1, the user interface 100 further includes a navigation button 400, the selection of which allows a user to prescribe a type of navigation tool for use in the navigation region 102. Particularly, when the navigation button 400 is selected, a menu is provided that allows a user to select from a list of available navigation tools for displaying and/or for searching content in the navigation region 102.

Figure 5A:
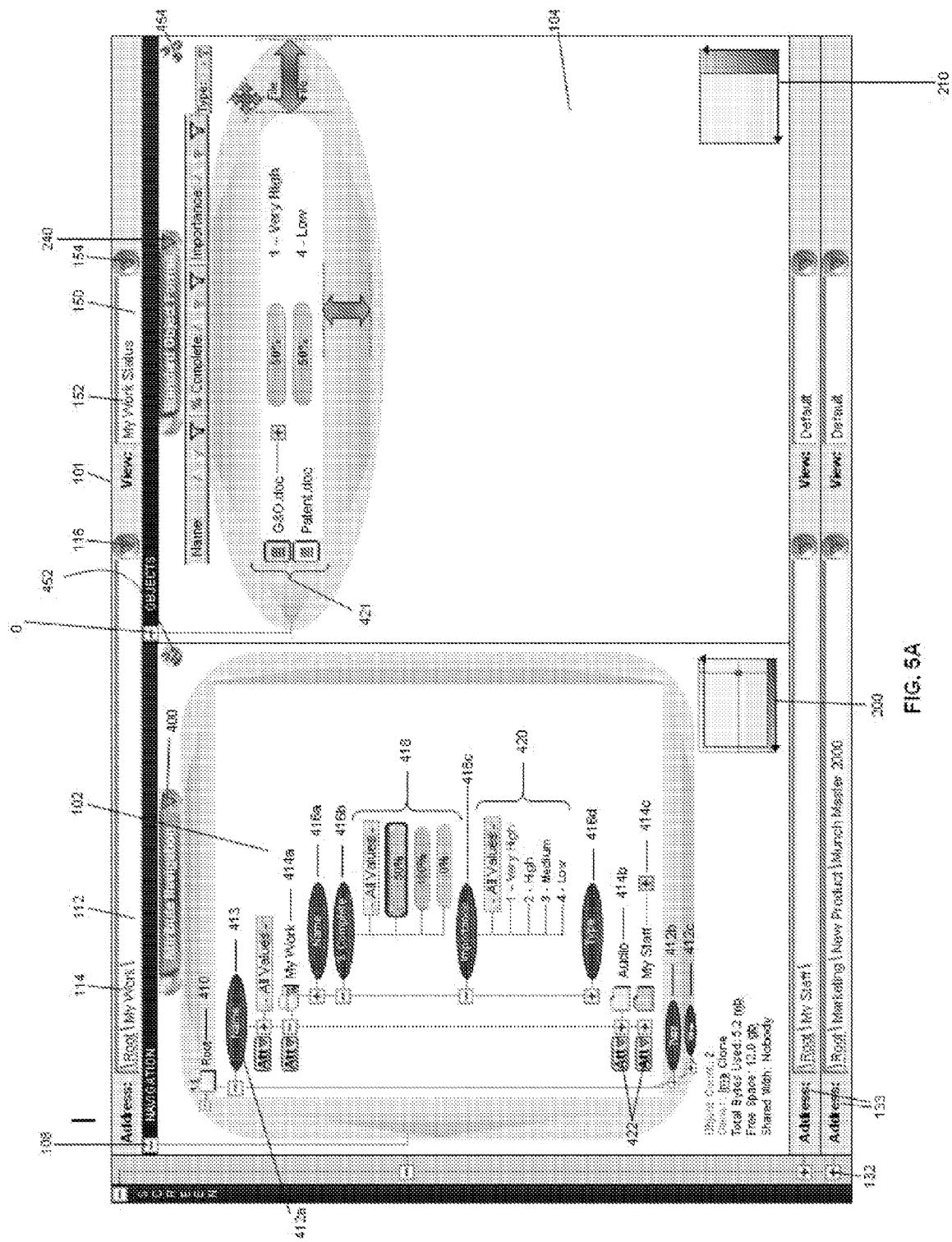
FIG. 5A illustrates the user interface of FIG. 1, showing the user interface providing an attribute-based navigation tool.

In some embodiments, the user interface 100 provides an attribute-based navigation tool, in which case, the navigation region 102 displays attributes of objects in a tree format (FIG. 5A). In such arrangement, attributes of objects in a folder is displayed under the folder. As shown in the illustrated example, "Name" attribute 412a, "Type" attribute 412b, and "Size" attribute 412c are displayed under the "Root" folder 410, indicating that the "Root" folder 410 contains one or a plurality of objects that have these attributes 412a-c. The identifiers of the attributes 412a-c are displayed in ellipses 413, which is one way of indicating to a user that the displayed object (or content) is an attribute. Other graphical representation can also be used to indicate that a displayed object is an attribute.

When the "Name" attribute 412a is selected, the user interface 100 displays the "Name" attribute values (e.g., "My Work" 414a, "Audio" 414b, "My Staff" 414c) under the "Name" attribute 412a in the navigation region 102. In the illustrated example, each of the displayed "Name" attribute values 414a-c represents a folder that can also "contain" one or more objects. Particularly, a second "Name" attribute 416a, a second "Type" attribute 416d, a "% Complete" attribute 416b, and an "Importance" attribute 416c are displayed under the "My Work" folder 414a, indicating that the "My Work" folder 414a contains one or more objects that have these attributes.

When the "% Complete" attribute 416b is selected, a menu 418 providing a range of "% Complete" attribute values is provided, thereby allowing a user to prescribe criteria for searching an object. In the illustrated example, the "% Complete" attribute value=50% is selected. Accordingly, the object region 104 displays all objects 421 within the "My Work" folder 414a that have "% Complete" attribute value of 50%.

Figure 5B:
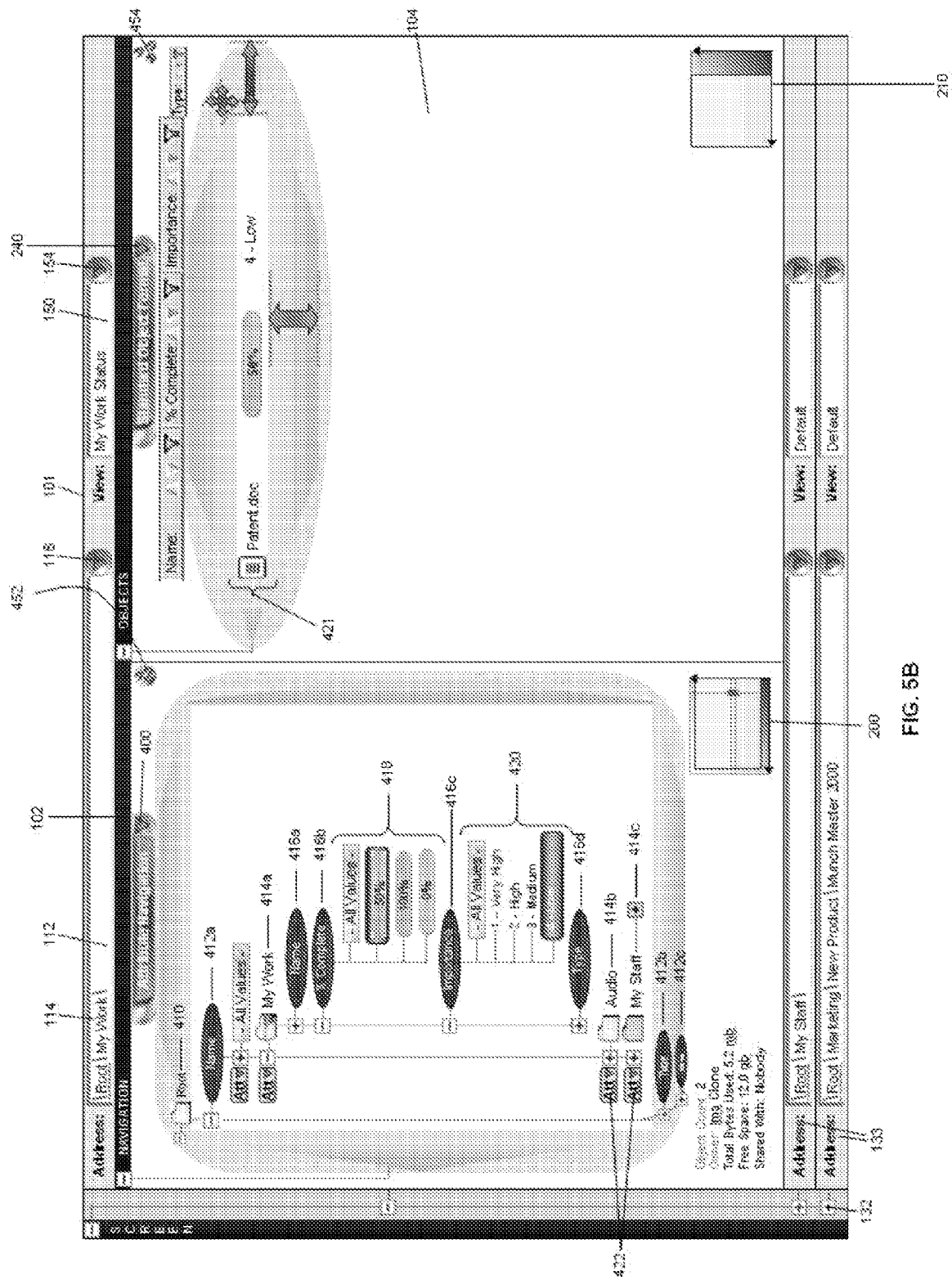
FIG. 5B illustrates the user interface of FIG. 5A, showing two attribute values have been selected.

Continuing with the illustrated example, when the "Importance" attribute 416c is selected, a menu 420 providing a range of "Importance" attribute values is provided, thereby allowing a user to prescribe criteria for searching an object. In the illustrated example, the "Importance" attribute value="Low" is selected together with the "50% Complete" attribute value (FIG. 5B). Accordingly, the object region 104 displays all objects within the "My Work" folder 414a that have "% Complete" attribute value of 50% and "Importance" attribute value of "Low".

In the illustrated embodiments, navigation-type markers 422 are provided adjacent to the folders 414a-c, indicating that attribute-based navigation is being used to navigate through content within these folders 414a-c. The navigation-type marker 422 is displayed as "Att" when attribute-based navigation is used. On the other hand, when standard navigation (name-based navigation) is used, the navigation-type marker 422 is displayed as "Std" (See FIG. 1). In other embodiments, the user interface 100 allows a combination of standard navigation and attribute-based navigation be used in the navigation region 102. For example, a user can prescribe content within the "My Work" folder 414a be navigated using attribute-based navigation, which prescribing content within the "Audio" folder 414b be navigated using standard navigation. In such case, the "My Work" folder 414a will have a navigation-type marker 422, "Att" next to it, while the "Audio" folder 414b will have a navigation-type marker 422, "Std" next to it. It should be noted that the navigation-type marker 422 is only an example of representing types of navigation, and that other graphical representations can also be used.

Although several attribute types and their corresponding attribute values have been described in the previous example, it should be noted that the user interface 100 can display other attribute types and attribute values. For examples, besides the "% Complete" attribute and the "Importance" attribute shown previously, the user interface 100 can also display "Urgency" attribute (e.g., for describing an urgency or priority of an object), "Authority" attribute (e.g., for identifying access authority for an object), or other attributes. In some embodiments, the user interface 100 can provide default attribute types and corresponding default attribute values. Alternatively, the user interface 100 can be integrated with proprietary software and/or users' operating systems, thereby allowing attribute types and values associated with files created by the proprietary software and/or operating systems be displayed in the navigation region 102 and the object region 104. In other embodiments, a user can create his/her customized attribute type(s) and corresponding attribute value(s). In addition, it should be noted that the above embodiment illustrates one example of navigating content based on their attribute types and attribute values, and that other attribute-based navigation methods can also be used. Further, the format in which the navigation region 102 presents the attribute-based navigation tool should not be limited to the "tree" format illustrated previously. In alternative embodiments, the navigation tool can have other default formats or formats that are customized by users.

Aggregation of Objects

Figure 6:
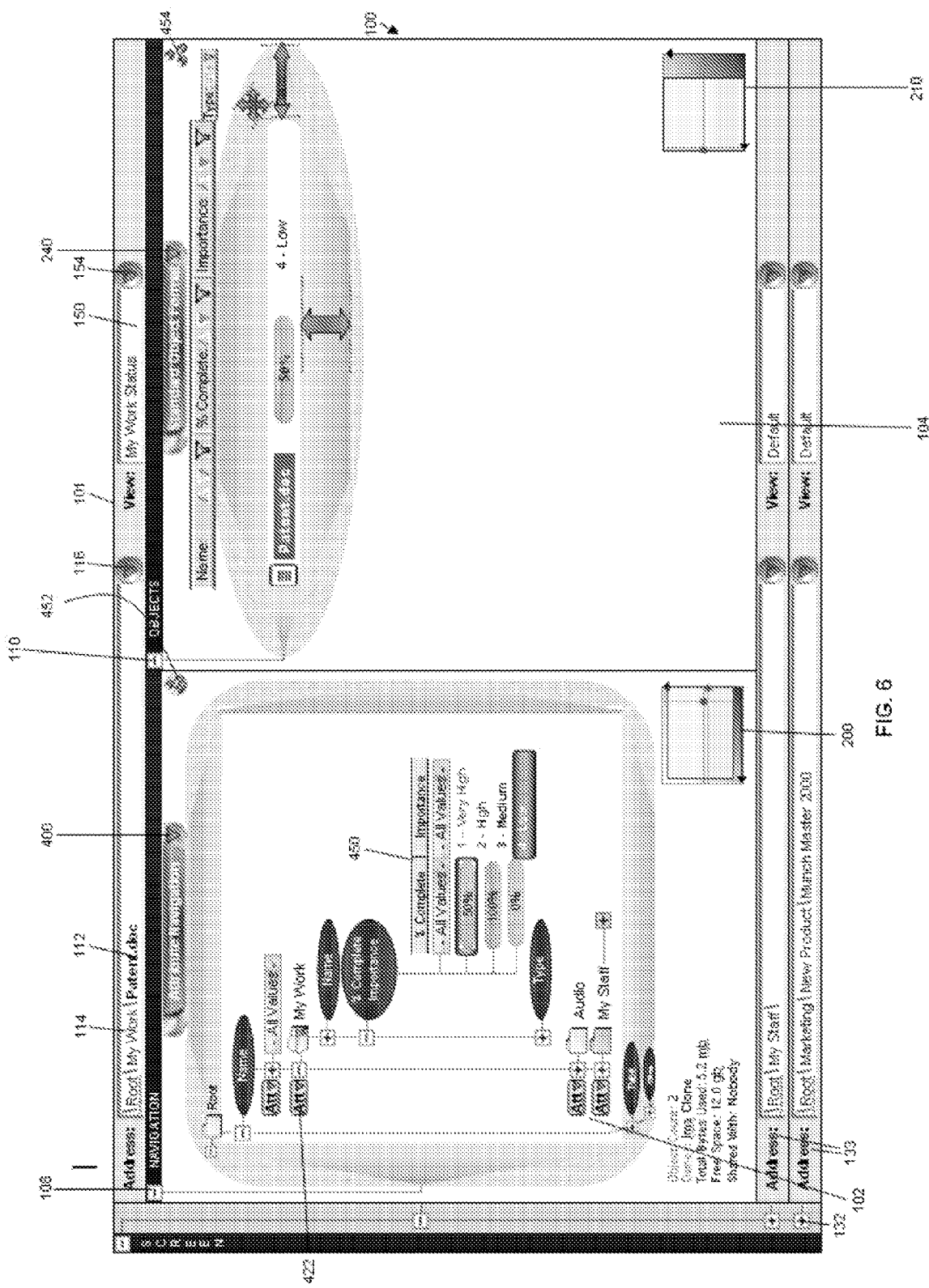
FIG. 6 illustrates the user interface of FIG. 1, showing two attributes have been combined.

In some embodiments, two or more attributes displayed in either of the navigation region 102 and the object region 104 can be combined. Referring to FIG. 5B, to combine the displayed "% Complete" attribute 416b with the displayed "Importance" attribute 416c, a user can position a pointer at the displayed "% Complete" attribute 416b and drag the displayed "% Complete" attribute 416b to a vicinity where the displayed "Importance" attribute 416c is located. Such operation would result in the displayed "% Complete" attribute 416b being combined with the "Importance" attribute 416c (FIG. 6). In the illustrated embodiments, the user interface 100 displays a combined attribute 450 "% Complete & Importance" to represent the combination of the "% Complete" attribute 416b and the "Importance" attribute 416c. In some embodiments, the "&" symbol between the displayed identifiers of the combined attributes can be highlighted in a color that is different from that of the identifiers of the combined attributes to indicate that the attribute being displayed is a result of a combination of two attributes. Alternatively, the "&" symbol can be bold, underlined, or italic. Also, in other embodiments, other graphics or other display format can be used to represent a combined attribute. In some embodiments, a separation button (not shown) can be provided adjacent the displayed combined attribute 450, which allows a user to separate the combined attributes upon a selection of the separation button. Although the above example has been described with reference to combining the "% Complete" attribute and the "Importance" attribute, the user interface 100 can also be used to combine other attributes. Also, besides combining two attributes, in other embodiments, the user interface 100 can be used to combine more than two attributes.

In the illustrated embodiments, the user interface 100 also provides a first aggregation indicator 452 associated with the navigation region 102, and a second aggregation indicator 454 associated with the object region 104. The aggregation indicators 452, 454 each has a first configuration and a second configuration. When the first aggregation indicator 452 is in its first configuration, it indicates to a user that no displayed objects. (e.g., identifiers of attributes) in the navigation region 102 has been combined. When the first aggregation indicator 452 is in its second configuration, it indicates to a user that at least one displayed object in the navigation region 102 is resulted from combining two objects. Similar is true for the second aggregation indicator 454 with respect to the object region 104. In the illustrated embodiments, the first configuration of each of the aggregation indicators 452, 454 includes three circles that are separated, and the second configuration of each of the aggregation indicators 452, 454 includes three circles that abut against each other. Alternatively, the first and the second configurations of each of the aggregation indicators 452, 454 can be represented by other graphics.

Folder Creation

Figure 7C:
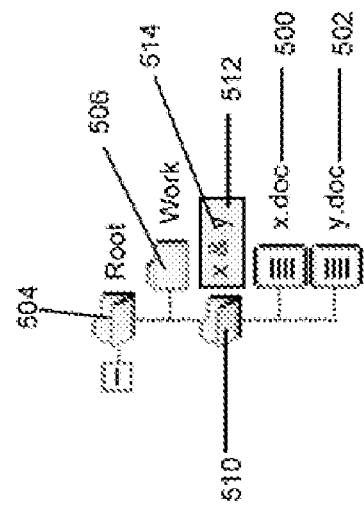
FIGS. 7A-7C illustrates a process for grouping two objects.
Figure 7A:
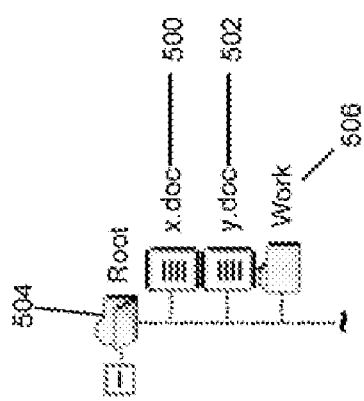
Figure 7B:
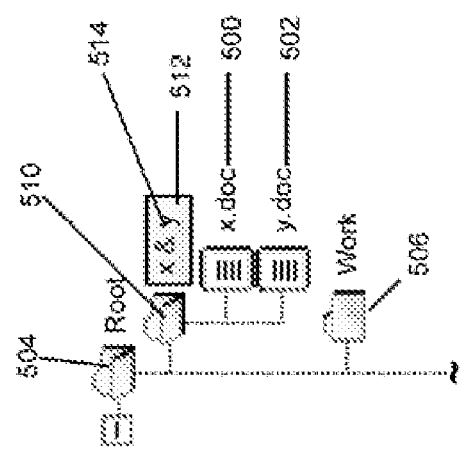

As discussed previously, the user interface 100 allows one or more folders be created for storing objects, such as files. In some embodiments, a folder can be created using a conventional process, e.g., by selecting a "File" button and then a "New Folder" button using a pointer. Alternatively, a folder can be created automatically. FIGS. 7A-7C illustrates a process for automatically creating a folder using the user interface 100 in accordance with some embodiments of the invention. As shown in FIG. 7A, "X.doc" file 500 and "Y.doc" file 502 are stored under "Root" folder 504. "Root" folder 504 also contains sub-folder 506 named "Work". In the illustrated embodiments, the user interface 100 allows a user to group the "X.doc" file 500 and the "Y.doc" file 502 by dragging one of them towards the other. For example, a pointer can be positioned at the displayed "Y.doc" file 502, and the displayed "Y.doc" file 502 can then be dragged to a vicinity of the displayed "X.doc" file 500. Such operation results in the user interface 100 displaying a new folder 510 for storing both the "X.doc" file 500 and the "Y.doc" file 502 (FIGS. 7B and 7C). An input field 512 is also provided that allows a user to input a name 514 for the new folder 510. Allowing a user to group objects using such method is advantages because it obviates the need to move the pointer to another menu to command a creation of a folder (as is the case with conventional user interfaces). The new folder 510 can be created as a sub-folder at a same level of a tree at which the files 500, 502 were previously stored (i.e., under the "Root" folder) (FIG. 7B). Alternatively, the new folder 510 can be created as a folder at a same level of the folder in which the files 500, 502 were previously stored (i.e., at a same level as the "Root" folder) (FIG. 7C). In some embodiments, the user interface 100 allows a user to prescribe where to create and/or store the new folder 510. Although the above example has been described with reference to grouping two files, in other embodiments, more than two files can be grouped. Also, in other embodiments, instead of grouping files, folders can also be grouped in a similar manner.

Computer System Architecture

Figure 8:
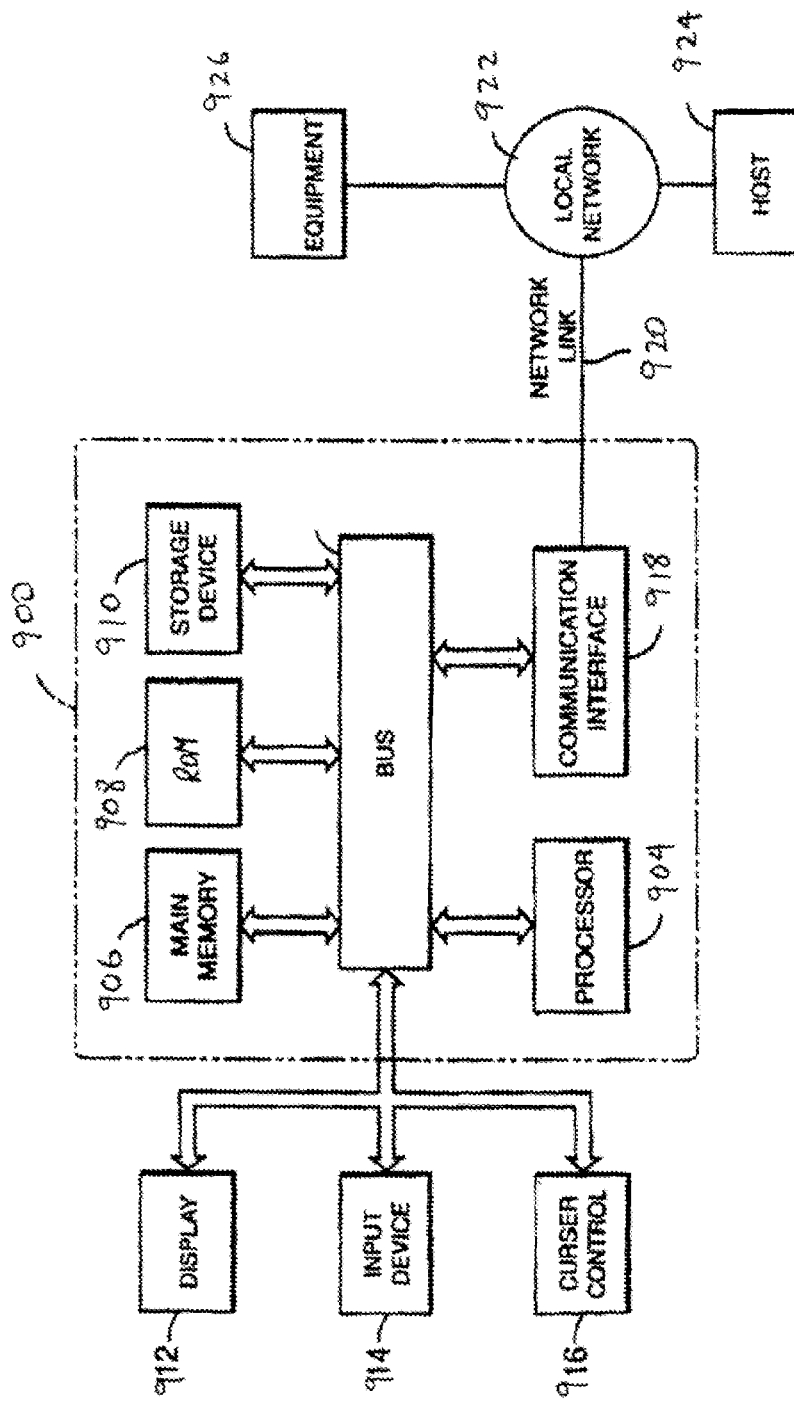
FIG. 8 is a diagram of a computer hardware system with which embodiments of the present invention can be implemented.

FIG. 8 is a block diagram that illustrates an embodiment of a computer system 900 upon which embodiments of the invention may be implemented. Computer system 900 includes a bus 902 or other communication mechanism for communicating information, and a processor 904 coupled with the bus 902 for processing information. The computer system 900 also includes a main memory 906, such as a random access memory (RAM) or other dynamic storage device, coupled to the bus 902 for storing information and instructions to be executed by the processor 904. The main memory 906 also may be used for storing temporary variables or other intermediate information during execution of instructions to be executed by the processor 904. The computer system 900 further includes a read only memory (ROM) 908 or other static storage device coupled to the bus 902 for storing static information and instructions for the processor 904. A data storage device 910, such as a magnetic disk or optical disk, is provided and coupled to the bus 902 for storing information and instructions.

The computer system 900 may be coupled via the bus 902 to a display 912, such as a cathode ray tube (CRT), for displaying information to a user. An input device 914, including alphanumeric and other keys, is coupled to the bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for managing data and electronic files. According to some embodiments of the invention, such use is provided by computer system 900 in response to processor 904 executing one or more sequences of one or more instructions contained in the main memory 906. Such instructions may be read into the main memory 906 from another computer-readable medium, such as storage device 910. Execution of the sequences of instructions contained in the main memory 906 causes the processor 904 to perform the process steps described herein. One or more processors in a multi-processing arrangement may also be employed to execute the sequences of instructions contained in the main memory 906. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to the processor 904 for execution. Such a medium may take many forms, including but not limited to, non-volatile media, volatile media, and transmission media. Non-volatile media includes, for example, optical or magnetic disks, such as the storage device 910. Volatile media includes dynamic memory, such as the main memory 906. Transmission media includes coaxial cables, copper wire and fiber optics, including the wires that comprise the bus 902. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to the processor 904 for execution. For example, the instructions may initially be carried on a magnetic disk of a remote computer. The remote computer can load the instructions into its dynamic memory and send the instructions over a telephone line using a modem. A modem local to the computer system 900 can receive the data on the telephone line and use an infrared transmitter to convert the data to an infrared signal. An infrared detector coupled to the bus 902 can receive the data carried in the infrared signal and place the data on the bus 902. The bus 902 carries the data to the main memory 906, from which the processor 904 retrieves and executes the instructions. The instructions received by the main memory 906 may optionally be stored on the storage device 910 either before or after execution by the processor 904.

The computer system 900 also includes a communication interface 918 coupled to the bus 902. The communication interface 918 provides a two-way data communication coupling to a network link 920 that is connected to a local network 922. For example, the communication interface 918 may be an integrated services digital network (ISDN) card or a modem to provide a data communication connection to a corresponding type of telephone line. As another example, the communication interface 918 may be a local area network (LAN) card to provide a data communication connection to a compatible LAN. Wireless links may also be implemented. In any such implementation, the communication interface 918 sends and receives electrical, electromagnetic or optical signals that carry data streams representing various types of information.

The network link 920 typically provides data communication through one or more networks to other devices. For example, the network link 920 may provide a connection through local network 922 to a host computer 924 or to an equipment 926. The data streams transported over the network link 920 can comprise electrical, electromagnetic or optical signals. The signals through the various networks and the signals on the network link 920 and through the communication interface 918, which carry data to and from the computer system 900, are exemplary forms of carrier waves transporting the information. The computer system 900 can send messages and receive data, including program code, through the network(s), the network link 920, and the communication interface 918. In some embodiments, the program code and data enable the computer system 900 to perform any or all of the functions described herein with reference to different embodiments.

Although particular embodiments of the present inventions have been shown and described, it will be understood that it is not intended to limit the present inventions to the preferred embodiments, and it will be obvious to those skilled in the art that various changes and modifications may be made without departing from the spirit and scope of the present inventions. For example, any or a combination of the operations performed by any of the modules of the system 10 can be performed by hardware, software, or combination thereof within the scope of the invention, and should not be limited to particular embodiments described herein. The specification and drawings are, accordingly, to be regarded in an illustrative rather than restrictive sense. The present inventions are intended to cover alternatives, modifications, and equivalents, which may be included within the spirit and scope of the present inventions as defined by the claims.

What is claimed:

1. A system for providing a user interface, comprising:
a processor configured to
    display a window in a screen, the window displaying a navigational tool for allowing a user to search for an object, wherein the tool includes a first graphic representing a first file, and a second graphic represent a second file,
    create a folder for storing the first and second files in response to the first graphic being dragged to an area adjacent to the second graphic, wherein the processor is configured to create the folder automatically to thereby obviate a need for the user to manually create the folder using a conventional folder creation process; and
    automatically assign a name for the created folder, and wherein the name comprises a first portion that represents a name of the first file, a second portion that represents a name of the second file, and a symbol "&" between the first and second portions.

2. The system of claim 1, wherein the first file comprises a word document file.

3. The system of claim 1, wherein the first file and the second file are stored directly under a parent folder, and after the folder is created by the tool, the first and second files are stored directly under the folder created by the tool.

4. The system of claim 3, wherein the folder created by the tool is under the parent folder.

5. The system of claim 3, wherein the folder created by the tool is at a same hierarchical level as that of the parent folder.

6. A computer product having a set of instructions that are stored in a volatile or non-volatile medium, an execution of which causes a process to be performed, the process comprising:
    displaying a navigational tool using a processor for allowing a user to search for an object, wherein the tool includes a first graphic representing a first file, and a second graphic represent a second file;
    creating a folder for storing the first and second files in response to the first graphic being dragged to an area adjacent to the second graphic, thereby obviating a need for the user to manually create the folder using a conventional folder creation process; and
    automatically assigning a name for the created folder, and wherein the name comprises a first portion that represents a name of the first file, a second portion that represents a name of the second file, and a symbol "&"between the first and second portions.

7. The computer product of claim 6, wherein the first file comprises a word document file.

8. The computer product of claim 6, wherein the first file and the second file are stored directly under a parent folder, and after the folder is created by the tool, the first and second files are stored directly under the folder created by the tool.

9. The computer product of claim 8, wherein the folder created by the tool is under the parent folder.

10. The computer product of claim 8, wherein the folder created by the tool is at a same hierarchical level as that of the parent folder.

* * * * *